Aug. 16, 1960     E. J. DIEBOLD     2,949,572
STATIC CURRENT REGULATOR FOR RECTIFIER
USING FLUX REVERSAL CONTROL
Filed Sept. 26, 1957     3 Sheets-Sheet 1

INVENTOR.
EDWARD JOHN DIEBOLD
ATTORNEYS

INVENTOR.
EDWARD JOHN DIEBOLD

INVENTOR.
EDWARD JOHN DIEBOLD

United States Patent Office 2,949,572
Patented Aug. 16, 1960

2,949,572

STATIC CURRENT REGULATOR FOR RECTIFIER USING FLUX REVERSAL CONTROL

Edward John Diebold, Palos Verdes Estates, Calif., assignor to I-T-E Circuit Breaker Company, Philadelphia, Pa., a corporation of Pennsylvania Filed Sept. 26, 1957, Ser. No. 686,388

7 Claims. (Cl. 321—18)

My invention relates to a static current regulator for rectifiers of the type that have their output voltage controlled by saturable reactor devices wherein the saturable reactor flux is controlled by my novel regulating device.

Voltage control of rectifier devices by means of saturable reactors is well known in the art and is fully described in my U.S. Patent No. 2,817,805 issued December 24, 1957 entitled Flux Reversal Circuit for Commutating Reactors of Mechanical Rectifiers for the case of contact type rectifiers. In general, the output voltage of a rectifier may be controlled by connecting a saturable type reactor in series with each rectifier phase. A control circuit for controlling the flux of the reactor is then applied to the reactor so that the length of time taken to saturate the reactor at the beginning of the conduction period may be controllably adjusted.

Thus, the length of time that positive voltage will fall across the load is adjusted and the output rectifier voltage is controlled accordingly.

By way of example, if when the forward voltage becomes positive the saturable reactor has an appreciable amount of flux which must first be reversed before the reactor is saturated, then the output voltage of the rectifier will be relatively small. If, on the other hand, the control circuit is operated in such a manner that a substantial portion of the flux has already been reversed at the time the phase voltage becomes positive, then the reactor will remain unsaturated for a relatively short time after the phase voltage becomes positive and the output rectifier voltage will be relatively high.

The control of the saturable reactor flux reversal prior to the time that the voltage on the particular phase is in the positive direction, or in the direction which will cause conduction of that phase, may be accomplished by many well known small current capacity circuits.

Furthermore, it is to be noted that the rectifying element may be of any desired type such as a contact (as in my above noted copending application), a metallic or semi-conductor device, or any other type of rectifying element.

In the past the flux reversal control current has been automatically controlled to maintain a constant output current for the rectifier by means of relatively complex hydraulic regulator systems which operate to control the impedance of a variable impedance element which, in turn, controls the flux reversal control current.

Thus, in a particular application, the hydraulic regulator will vary the impedance of the variable impedance element (which could be a potentiometer) so that a constant output current will be measured by measuring devices associated with the regulator unit. Hydraulic regulators of this type are clearly set forth in U.S. Patent No. 2,759,128 issued August 14, 1956 entitled Reactors to Otto Jensen and, as will be seen by reference to this application, are relatively complex, expensive devices.

Furthermore, the response time of these devices is relatively slow because of the inertia of the movable parts, this condition frequently leading to rectifier faults since the rectifier cannot follow a transient condition quickly enough.

Another serious disadvantage of the hydraulic type regulator is that the reference standard to which the input signal is compared is not adjustable so that it is necessary to make the adjustment when setting the regulator at a new current value at the output signal of the rectifier or the input signal of the regulator.

Therefore, the regulator stability depends upon the setting of the load, and thus, the magnitude of the error signal depends upon the current setting of the rectifier. Hence, at low loads the rectifier will be relatively unstable, and when several rectifiers are connected in parallel but with different load ranges within which the individual rectifiers are stable, the stability problem becomes particularly severe.

In addition to the above noted problems, hydraulic regulators tend to drift and creep, their performance depending upon parameters such as oil viscosity, temperature, age, and so on.

The principle of my invention is to provide a purely static current regulator which utilizes magnetic amplifier circuitry and eliminates all movable parts.

In essence, my novel regulator has an input signal which is related to the load current, and this input signal is compared with an adjustable reference standard. The difference signal is then amplified in an amplifying means and the amplifier output controls the flux reversal current to the control saturable reactors to bring the error signal to zero. For purposes of stability, a negative feed back signal is returned to the amplifier, and further cross compounding signals from parallel connected rectifiers are also applied to the amplifier.

In one embodiment of my invention, the error signal or the difference between the input signal and the reference signal is applied to a preamplifier stage which, as will be seen hereinafter, may also provide compounding with relation to other parallel operated rectifiers, and the output of this preamplifier stage is then applied to an integrator circuit.

The integrator circuit output is then applied to a power amplifier which is connected in series with a shunt and has a filtered output, the output being applied to the control windings of the saturable control reactors. The voltage appearing across the shunt is utilized as a source of negative feed-back voltage which is taken back to pre-amplifier stage for purposes of stability.

As mentioned above, the preamplifier stage may be utilized as a comparison stage for comparing the current conditions of parallel connected rectifiers so that a predetermined load division between the rectifiers may be maintained in view of the interdependency on output voltage.

In another embodiment of my novel invention, feedback is achieved by means of a first signal which is proportional to the output voltage and a second signal which is proportional to the rate of change of rectifier output current. This system eliminates the integrator circuit above mentioned and the current rate measuring devices may provide signals for cross-compounding with parallel connected rectifier systems.

Accordingly, it is seen that my novel regulator is entirely static and does not contain components which appreciably deteriorate with age. The performance of the regulator is independent of ambient temperature and its adjustment is stable under many parameters such as time, temperature, pressure, etc.

Furthermore, the regulator is of extremely small size when compared to the presently used hydraulic regulators, and requires substantially no maintenance, readjustment or replacement.

Another advantage of my novel static regulator is that it is completely independent of the rectifier structure per se, and can be located at any place which is convenient, such as in a control cubicle or in some control panel. The operation of the regulator can be easily monitored by means of small electrical instruments and transient analysis may be easily made by an easily connectable oscilloscope.

One of the major advantages of my novel static regulator is that the inherent time constant of the system can be easily controlled by controlling the time constant of its feed-back circuit. Similarly, the cross compounding feed-back of other regulators of parallel connected rectifiers can be adjusted at will, or easily changed by replacing small, cheap components such as resistors and capacitors.

Since operation of my novel circuit follows the operation of the well-known zero error regulators wherein the difference between the rectifier output and the reference standard is brought to zero by the regulator by controlling the flux reversal of the control reactors of the rectifier, the output current of the rectifier may be easily controlled by adjusting the reference standard (which could be a constant voltage). Thus, it is not necessary to adjust the signal return to the regulator from the rectifier output so that the regulator will be stable under any condition of load or parallel operation of a plurality of rectifiers.

Furthermore, the regulator circuits may contain true D.-C. amplifiers which do not exhibit drift, creep or internal oscillation. Since the regulator is small, entirely static, and relatively inexpensive, it is economically feasible to provide one complete regulator for a rectifying system to thereby provide an automatically balanced output load for each rectifier system of a plurality of parallel connected rectifier systems even though these systems operate under adverse conditions. This inherent load balance is true even if the rectifying systems themselves have different impedances or timing adjustments (in the case of contact rectifiers) to thereby have a different output voltage, since the regulators will automatically compensate for this unbalance.

In addition, the regulator will compensate for phase errors introduced in the voltages supplying the rectifiers regardless of whether these phase errors originate within the rectifiers themselves or in the system feeding the rectifiers. Similarly, when harmonic voltages present in the supply voltage unbalance the load, my novel regulator will automatically achieve load balance even if these harmonics change in magnitude and phase to cause a continuously changing unbalance.

It is also possible to use the static regulator in such a way that no harmonic feed-back occurs between the rectifier control circuit and the regulator itself, this being true for either a harmonic feed-back of the operating frequency of the rectifier or D.-C. transients caused by the rectification of these harmonics. Another feed-back which is eliminated is the A.-C. harmonic feed-back from the rectifier power circuit to the control circuits of the rectifier.

As heretofore mentioned, the compounding signal which is applied to the various regulators in a plurality of parallel connected rectifier systems may in part be proportional to the rate of change of output current. This type of signal may be taken from transformers connected in the D.-C. circuit of the respective rectifiers whereupon a signal is obtained when the output current of the associated regulator is changed.

Thus, when two rectifiers are compounded with one another and the output current of one decreases, a compounding feed-back signal will be impressed upon the regulator of the other rectifier so as to cause its output current to decrease accordingly. These current decreases prevent unbalancing from occurring between the rectifiers, and the output currents will be subsequently brought back to their predetermined values by their own regulator operation which proceeds when the output current decreases below the value determined by the adjustment of the reference standard.

Clearly, when a plurality of rectifier systems are utilized each regulator system will receive a compounding signal from each of the other regulators so that the complete parallel connected system will be compounded to operate as above described.

Accordingly, a primary object of my invention is to provide a novel static current regulator for controlling the output current of a rectifier.

Another object of my invention is to provide a small inexpensive regulator which does not utilize moving parts for control of the flux reversal current of a saturable reactor.

Another object of my invention is to provide a novel current regulator for rectifier systems utilizing magnetic voltage control wherein a plurality of rectifier systems having their own respective regulators may be cross-compounded with one another so as to prevent load unbalance between systems.

Still another object of my invention is to provide a novel regulating system for rectifier devices which has a short response time.

A further object of my invention is to provide a novel regulator for rectifier systems which is independent of the rectifier structure.

Another object of my invention is to provide a novel regulator for rectifiers utilizing magnetic voltage control wherein the load current of the rectifier is adjusted by adjustment of a reference standard within the regulator.

A still further object of my invention is to provide a novel static current regulator for rectifier systems which does not utilize moving parts, is easily adjustable and may be continuously monitored by monitoring instruments.

Another object of my invention is to utilize a true zero error regulator for control of the flux reversal current of a saturable reactor utilized for the voltage control of a rectifier.

These and other objects of my invention will now be apparent from the following description when taken in connection with the drawings, in which.

Figure 1:
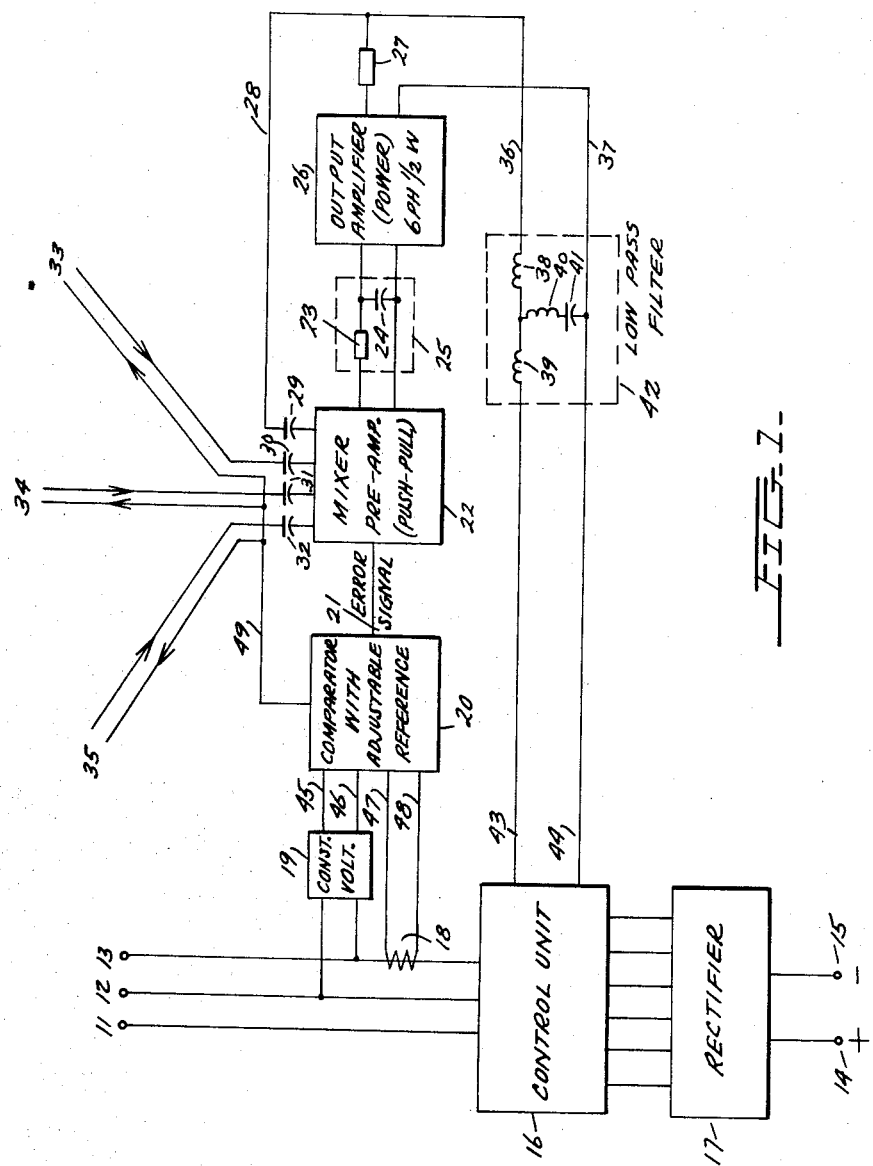
Figure 1 shows a first embodiment of my novel regulator circuit in a simplified block diagram.

Referring now to Figure 1, a three phase A.-C. source of power connected at terminals 11, 12 and 13 will deliver D.-C. power at the rectifier output terminals 14 and 15 by virtue of the rectifier element 17 and a control unit 16 which controls the rectifier unit 17.

It is to be noted that the rectifier element contained within block 17 may be of any type such as the contact type set forth in my U.S. Patent No. 2,817,805, or of the semi-conductor type of diode.

The control unit 16 is comprised of saturable type reactors which, as may be seen in my above noted U.S. Patent No. 2,817,805, operate to regulate the output voltage of the rectifier through a small flux reversal control current.

Since, for most practical applications, the function of my novel static current regulator is to control the control unit 16 in such a manner that a constant D.-C. current will flow to the load connected at terminals 14 and 15, I first provide a sensing means for measuring the load current, this sensing means comprising a current transformer 18.

Furthermore, since my novel static current regulator is of the zero error type it is necessary to provide an adjustable standard to which the input signal may be compared whereupon these signals are brought to zero so as to maintain a predetermined constant output current. This reference standard comprises member 19 which is a constant voltage output device having its input connected across phases 12 and 13. However, the output of the constant voltage device 19 will be constant regardless of the voltage variations of the input voltage. Since this type of device is well known in the art, it will not be further described herein.

Outputs of both the current transformer 18 and the constant voltage device 19 are then applied to a comparator device 20 which compares the reference voltage of constant voltage device 19 to the output of current transformer 18 which is proportional to the load current. This comparator device 20, wherein adjustment of the reference standard voltage may be made so as to adjust the desired current magnitude which is to be maintained, produces an error signal which is impressed upon conductor 21 when the comparator measures a difference between the reference standard and the input signal which is proportional to the load current.

Thus, if the current of phase 13 is exactly equal to the magnitude given by the reference standard, the error signal current in conductor 21 will be zero. However, if the load current is too high, then the error signal in conductor 21 will be a negative D.-C. current and, conversely, if the current in phase 13 is too low, then the error signal current in conductor 21 will be a positive D.-C. current.

Furthermore, the magnitude of the error signal will be proportional to the magnitude of the deviation of the load current from the predetermined value set by the reference standard device.

Since, for most practical applications, the error signal current is relatively small and because the control unit 16 requires a constant D.-C. current of a certain fixed magnitude which is determined by the point at which the rectifier operates rather than the magnitude of an error signal, it is now necessary to utilize this error signal in such a manner as to control the input current to the control unit 16 to alter the current in phase 13 as required to bring the error signal back to zero.

Thus, the error signal of conductor 21 is first applied to a preamplifier device 22 which is of the push-pull type, this type amplifier being able to amplify a D.-C. signal which is either positive or negative and giving a D.-C. output which is proportional to the input which is larger in magnitude. Furthermore, by using a relatively good push-pull amplifier there will not be any drift when the input error signal is zero.

The preamplifier device 22 further operates to mix other signals from other rectifier systems operating in parallel with the rectifier system comprising rectifier element 17, and also receives a feed-back signal from its own output, as will be seen hereinafter.

The output of the preamplifier device 22 is impressed upon an integrator circuit 25 which consists of a relatively high resistance resistor 23 and a relatively low reactance capacitor 24.

The integrator 25 will accumulate the signals received from the preamplifier device 22 and change these current signals into a constant voltage which will appear across the capacitor 24. Hence, if the output of preamplifier 22 (which, as will be seen hereinafter, depends on feed-back signals from compounded rectifiers as well as the feedback signal of the instant regulator circuit) is zero, then no current is fed to the capacitor 24, and its voltage remains constant. It is important to note that the capacitor voltage 24 in this case will remain constant rather than being zero when no current flows therethrough.

Thus, the capacitor 24 will integrate the output signal of the preamplifier 22 so that if the preamplifier 22 has a positive output the voltage of capacitor 24 will increase, while if the output of preamplifier 22 is negative, then the voltage of capacitor 24 will decrease. Furthermore, the rate of change of voltage of capacitor 24 is directly proportional to the current output of the preamplifier.

The resistor 23 is chosen to be high enough to prevent a feed-back of voltage on the capacitor 24 into the preamplifier so that the current fed to capacitor 24 depends only on the input of the preamplifier independently of the voltage of the capacitor 24. Accordingly, a substantial amount of power which is generated by the preamplifier is lost in resistor 23, and the signal which issues from capacitor 24 is of relatively small magnitude. Because of this, the output of capacitor 24 is connected to the input of a power amplifier 26, this output amplifier 26 transforming the small D.-C. voltage appearing on capacitor 24 into a large D.-C. current with a very small drain on capacitor 24 and a substantial output voltage at the output of power amplifier 26.

The output current of power amplifier 26 which, as will be seen hereinafter, comprises the flux reversal control current for control unit 16 is first passed through a shunt 27, the voltage of which is used as a negative feedback signal which is applied to the preamplifier 22 through the capacitor 29 over the conductor 28.

Other feed-back signals are impressed upon the preamplifier 22 through capacitors 30, 31 and 32 which are cross compounding feed-back signals from other rectifiers connected in parallel with the rectifier 17, these other rectifiers being schematically identified at numerals 33, 34 and 35 respectively.

Therefore, the input of the preamplifier 22 includes not only the error signal at conductor 21, but further includes the feed-back signals applied to capacitors 29, 30, 31 and 32. Therefore, the sum of the error signal and all of the feed-back signals contribute to control the output of preamplifier 22. It will, however, be noted that these feedback signals are sensitive only to changes in current, and steady voltage conditions on their respective lines do not affect preamplifier operation.

Accordingly, the output current of output amplifier 26 is controlled responsive to a deviation of the current of its respective rectifier device from some predetermined standard as well as from cross compound signals from other parallel connected rectifiers for reasons to be described hereinafter.

In operation, if the output current flowing through conductors 36 and 37 is too small and the output voltage at terminals 14 and 15 is too high, to thereby generate a load current which is too low, then a positive error signal will be applied to conductor 21 causing a positive output current of preamplifier 22. This positive output current will charge capacitor 24 to a higher voltage to thereby cause a higher current output at power amplifier 26. This, in turn, increases the current applied to control unit 16 to thereby increase the output voltage of the rectifier and thus increase the load current, this change being in the direction to decrease the error signal in conductor 21 to zero.

Therefore, the operation of integrator circuit 25 is seen to be that of a storage or memory device which transforms a change signal into a steady state signal and remaining constant when no change is required.

The output of power amplifier 26 may be filtered in a low pass filler 42 which could, for example, comprise reactors 38, 39 and 40 and capacitor 41. This low pass filter 42 will prevent the ripple output of output amplifier 26 to upset the control unit 16.

The control unit, in turn, when of the type set forth in my U.S. Patent No. 2,817,805 is subjected to a large six phase ripple which will counteract any ripple of the power amplifier 26.

Since the magnitude and phase angle of the various harmonics may not be constant, they do not balance out properly, and for that reason it may be necessary to provide a low pass filter such as the filter 42. By further making this filter a low pass filter having a sharp cut-off, the speed of response of the regulator will be relatively unaffected.

More specifically, the cut-off frequency of the filter is selected substantially below the sixth harmonic of the fundamental frequency of the A.-C. supply, and substantially above the fundamental frequency itself to thereby permit the regulator to operate with its inherent half-cycle response.

Figure 2:
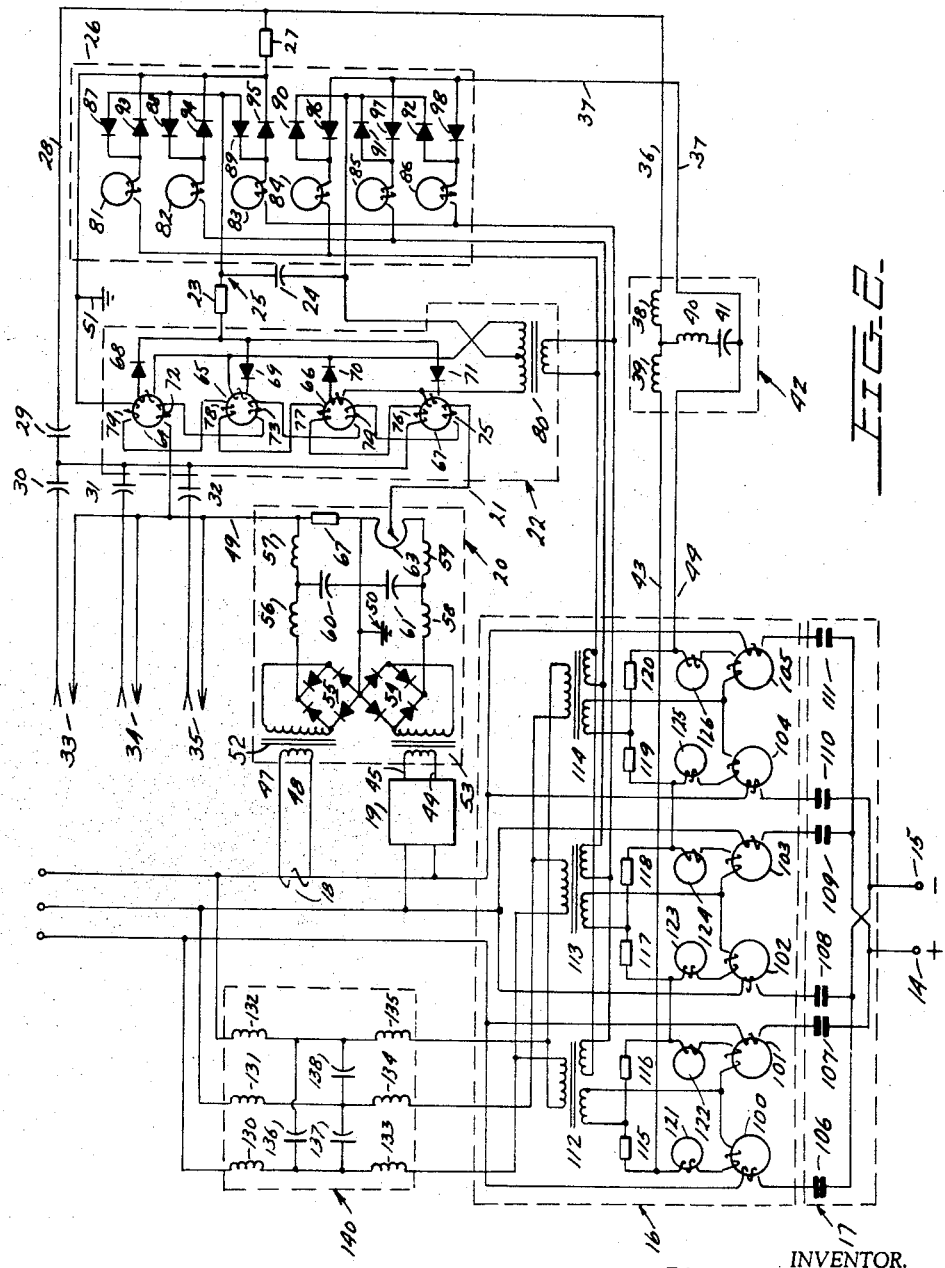
Figure 2 shows one circuit that would satisfy the block diagram of Figure 1.

One circuit which will satisfy the schematic block diagram of Figure 1 is set forth in Figure 2 wherein similar components have been identified with similar numerals.

More specifically, the comparator shown in dotted square 20 in Figure 2 may comprise the two isolating and voltage boosting transformers 52 and 53, the primaries of which are connected to the current transformer 18 and the constant voltage device 19 respectively.

The outputs of transformers 52 and 53 are rectified in the opposition connected bridging rectifiers 54 and 55 respectively, their negative terminals being joined together and grounded at ground 50. The output of rectifiers 54 and 55 is filtered in the filter circuit including reactors 56, 57, 58 and 59 and capacitors 60 and 61 wherein reactors 56 and 57 and capacitor 60 filter the output of rectifier 55, while reactors 58 and 59 and capacitor 61 filter the output of rectifier 54.

In view of these filtering networks, the output of rectifier 55 will appear as a relatively smooth D.-C. voltage across the output resistor 67, while the output voltage of rectifier 54 will appear as relatively smooth D.-C. voltage across the potentiometer 63.

Hence, the voltage appearing across resistor 67 is a voltage which is proportional to the current measured by the current transformer 18, while the voltage appearing across the potentiometer output circuit is an adjustable constant voltage which will operate as a reference standard for the voltage appearing across resistor 67, these two voltages being in opposition to one another.

Accordingly, any voltage difference between the voltages appearing across the output of potentiometer 63, which is the reference voltage, and the resistor 67 will appear as a difference voltage between conductors 21 and 49 of Figure 2 (see Figure 1).

Thus, the output load current may be easily adjusted by merely adjusting potentiometer 63 so that the rectifier load current will be altered until the voltage drop across resistor 62 will counter balance the voltage drop across the potentiometer 63.

It is to be noted that when cross compounding between a plurality of rectifiers such as represented at numerals 33, 34 and 35 is to be utilized, the conductor 49 will feed its cross compounding signal to the various associated rectifiers.

The output signal, if any, appearing across conductors 21 and 49 is then applied to the preamplifier 22, as seen in Figure 1, this preamplifier comprising a magnetic amplifier in the embodiment of Figure 2.

More specifically, preamplifier 22 comprises saturable reactor cores 64, 65, 66 and 67 and their associated diode elements 68, 69, 70 and 71 respectively.

Each of the above noted saturable reactor cores have input windings 72, 73, 74 and 75 which are connected in series with conductors 21 and 49 and feed-back windings 76, 77, 78 and 79, as will be seen hereinafter, receive a feed-back signal from shunt 27 as well as across compounding feed-back signals from rectifiers 33, 34 and 35 through the coupling capacitors 29, 30, 31 and 32 respectively.

It will be noted that the circuit including the feed-back windings 76, 77, 78 and 79 is grounded on one side by ground 51 so that the voltage applied to the feed-back circuits will appear between the ground 50 of the other rectifier circuits and their resistors similar to resistor 62 and the ground 51 of the rectifier under consideration.

The preamplifier 22 is energized by the single phase center tap transformer 80 and its output is taken from the rectifiers 68, 69, 70 and 71 and their respective output windings and appears across the integrator circuit shown generally at 25 and comprising resistor 23 and capacitor 24.

The integrator circuit output which appears across capacitor 24 is, as was shown in Figure 1, applied to the power amplifier seen in the dotted square 26.

In Figure 2 this power amplifier is comprised of a three phase bridge amplifier having its positive terminal connected to conductor 36 and its negative terminal connected to conductor 37, the shunt 27 being in series with conductor 26.

More specifically, the power amplifier of Figure 2 comprises the saturable cores 81, 82, 83, 84, 85 and 86, each core being associated with diodes 87, 88, 89, 90, 91 and 92 respectively. The control winding and output winding of magnetic cores 81 through 86 are one and the same, the diodes 87 through 92 preventing reversal of control current, while diodes 93 through 98 rectify the output voltage. This type of power amplifier is desirable in this type of application because of its very high gain and half-cycle response.

A certain amount of power at the output of the power amplifier is taken from shunt 26 and is applied between ground 51 and conductor 28 to the capacitor 29 and the preamplifier 22, as has been above described in Figure 1. The remaining output power of the power amplifier 26 is applied across conductors 36 and 37 and filtered by the low pass filter 42 which is identical to that described in Figure 1, and is thereafter applied to the rectifier control shown in the dotted lines forming square 16.

The rectifier elements contained in square 17 of Figure 2 comprise contact elements of the type shown in my U.S. Patent No. 2,817,805 and in a similar manner, the output voltage control means contained in dotted box 16 is of the type set forth in the above noted copending application.

More specifically, the rectifier elements (which could be metallic or semi-conductor elements) comprise the contacts 106, 107, 108, 109, 110 and 111 which are open and closed in synchronism with the frequency of the input A.-C. voltage at terminals 11, 12 and 13 in the manner well known in the art.

Control of the output power is achieved by control of the so-called commutating reactors 100, 101, 102, 103, 104 and 105 respectively which are in essence saturable type reactors of well known construction.

The flux reversal of the above noted commutating reactors is then controlled by the flux reversal circuitry shown which includes the transformers 112, 113, and 114, resistors 115—116, 117—118, 119—120, and auxiliary saturable reactors 121—122, 123—124, and 125—126 for each of the three phases respectively.

Since the operation of the above described flux reversal circuit is fully described in my U.S. Patent No. 2,817,805 which is herein made a part of the instant application, it will suffice to indicate that the flux of saturable reactors 100 through 105 will be controlled responsive to the D.-C. current flowing in the input conductors 43 and 44 which are connected to the output of filter 42.

It is only necessary to understand that by increasing the control current flowing in conductors 43 and 44 that the output voltage of the rectifier at terminals 14 and 15 will increase, and conversely, a decrease in the control through conductors 43 and 44 will cause a decrease in the output voltage at terminals 14 and 15.

In order to prevent feed-back by harmonics of the A.-C. supply system, the power leading to the control unit 16 and the amplifiers 22 and 26 may be filtered by a three phase low pass filter seen in the dotted box 140 of Figure 2, this figure comprising chokes 130 through 135 and capacitors 136, 137 and 138.

The operation of the circuitry set forth in Figure 2 follows, in a substantially identical manner, that described in conjunction with the block diagram of Figure 1. Thus, when there is a mismatch between the load current flowing from terminals 14 and 15 and some preselected current, then there will be a voltage output across conductors 21 and 49, this voltage output being a small D.-C. voltage having a polarity which depends upon the direction of the mismatch and having a magnitude which depends upon the excursion of the measured current from its predetermined value.

This error signal is applied to the preamplifier device 22 which, in turn, applies a voltage to the output of the integrator circuit 25 in such a manner that the voltage across capacitor 24 will be changed to a higher or a lower amount depending upon whether there is a positive or a negative output of the preamplifier 22.

The output of the integrator circuit 25 serves as the input for the power amplifier 26 which produces a higher or a lower D.-C. output depending upon the signal from the integrator circuit 25.

A first feed-back signal is then taken from shunt 27 in the output of amplifier 26 and is applied through capacitor 29 to the preamplifier 22, while cross compounding feed-back signals are taken from other rectifier systems 33, 34 and 35 through capacitors 30, 31 and 32 respectively to the preamplifier 22.

It is to be noted that the preamplifier 22 will see the summation of each of these feed-back signals as well as the error signal at its input and its output to the integrator circuit 25 will be adjusted accordingly.

The feed-back signal impressed upon capacitor 29 is a negative feed-back signal which will prevent an over-shooting of the regulator since it will have a counter-effect upon the error signal. Thus, if the error signal is positive and the output current of amplifier 26 rises, the voltage on resistor 27 will be increased so as to cause a charging current to flow through capacitor 29 and oppose the effect of the increased error signal.

The cross compounding feed-back circuits between rectifiers operates to cause a decrease of current in all rectifiers operating in parallel when the current of any one suddenly rises, as would occur if any particular rectifier back-fires. This effect prevents equalizing oscillations between the various rectifiers which may be sufficiently violent to damage them and further allows sufficient time for the damaged rectifier to be taken off the line and the load redistributed between the remaining rectifiers.

Figure 3:
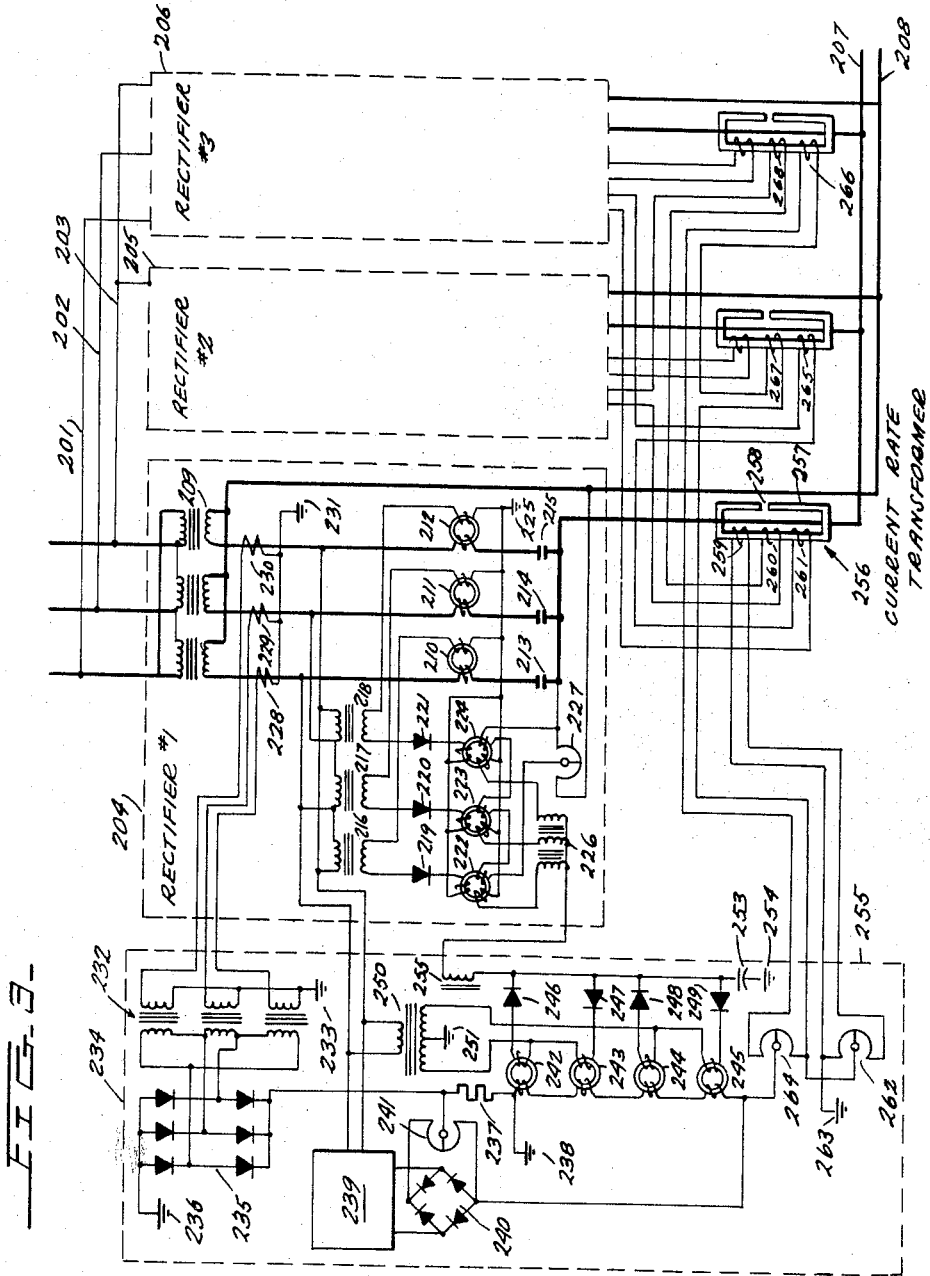
Figure 3 shows a second embodiment of my novel invention.

A further embodiment of my novel invention is set forth in Figure 3 which shows still another manner of achieving automatic control of the flux reversal current of a rectifier by a completely static regulator which is stabilized by feed-back means in accordance with my novel invention.

Figure 3 more specifically shows an input multiphase power source as represented by conductors 201, 202 and 203 which is connectable to rectifier devices contained within dotted boxes 204, 205 and 206. These rectifiers will hereinafter be described as rectifier systems 1, 2 and 3 respectively.

The output of each of the rectifiers is then taken to load conductors 207 and 208, these load conductors being connectable to a D.-C. load.

As in the case of the above described invention, my novel regulator system will maintain the load current at the D.-C. output of each of rectifier systems 1, 2 and 3 at some constant predetermined magnitude, and further will provide a cross-compounding between the rectifiers.

For illustrative purposes, rectifier system No. 1 is more completely shown as comprising a power transformer 209 having a Y connected secondary with its neutral being taken to D.-C. bus 208, and each of its three phases being connected in series with saturable reactors 210, 211 and 212 respectively, which in turn are connected in series with rectifying elements schematically indicated as rectifying elements 213, 214 and 215 respectively.

The output of each of rectifier elements 213, 214 and 215 are then connected together and to the D.-C. bus 207.

It is to be noted that the rectifier system No. 1 as set forth herein comprises a three phase half-wave rectifier. Clearly, however, my invention would be equally applicable to a full wave rectifier of the type set forth in Figure 2, or in any type rectifier connection wherein magnetic control of the output voltage is possible.

In order to control the flux of saturable reactors 210, 211 and 212 so as to control the output voltage of the system, I have provided a control circuit which includes auxiliary transformers 216, 217 and 218 respectively, which are connected in series with diodes 219, 220 and 221 respectively, and output windings of auxiliary control saturable reactors 222, 223 and 224 respectively, and a flux reversal control winding for each of the reactors 210, 211 and 212 respectively. The lower portion of each of the saturable reactor control windings of saturable reactors 210, 211 and 212 are connected together and then grounded at ground 225.

It is to be understood that by controlling the flux reversal of the auxiliary control saturable reactors 222, 223 and 224 that the flux reversal energization applied to saturable reactors 210, 211 and 212 from the control power sources 216, 217 and 218 will be controlled. Thus, the purpose of my novel static regulator system, as set forth in Figure 3, is to appropriately control the flux of the auxiliary control reactors 222, 223 and 224.

This control circuit is comprised of two sections, the first section comprising a first control winding on reactors 222, 223 and 224 which is energized in series with the three phase harmonic choke 226, and the second section comprising a stabilizing feed-back energization winding which is energized through the rheostat 227 which is connected directly across the output terminals of the rectifier system.

The biasing windings which are connected to the choke 226 are energized by a current which is proportional to an error signal which has a magnitude determined by the excursion of the rectifier load current with respect to some predetermined current and a polarity which is determined by the polarity of the difference between the actual current and the desired current.

The actual load current drawn by the rectifier system is measured by the current transformers 228, 229 and 230 in the three phases of rectifier system No. 1, and have their lower terminals connected to a common ground 231. The output of these current-transformers is impressed upon transformer 232 which has a delta-connected primary winding grounded at ground 233, and is contained within the regulator portion of the system indicated within the dotted box 234.

It is to be noted that each of rectifier systems Nos. 2 and 3 will have a similar regulator system associated therewith, and the same components and operation thereof will be similar to that described herein for the case of the regulator for rectifier system No. 1.

The output voltage of transformer 232 is impressed across a three phase bridge connected rectifier 235 which has one D.-C. output lead at ground 236 and has its other D.-C. lead connected to a shunt 237 and back to ground at ground 238.

Accordingly, it is seen that the voltage drop across the shunt 237 will be proportional to the current drawn by the rectifier as measured by the current transformers 228, 229 and 230.

In order to make this regulator a zero error regulator, this measured current must be compared to some standard value, as has been described above in conjunction with Figures 1 and 2. This reference standard signal is obtained from the constant voltage transformer 239 which may be energized from any convenient A.-C. source which could be variable in magnitude. The output of constant voltage transformer 239, however, is a constant value and is rectified in the bridge rectifier 240 with the output of rectifier 240 being impressed across the potentiometer 241. That is, a reference standard voltage will appear across the potentiometer 241, this reference standard voltage being adjustable by adjustment of the potentiometer.

The voltage across the lower portion of potentiometer 241 is connected in series opposition with the voltage across the shunt 237, and a difference voltage between these two voltages forms the error signal for driving a magnetic amplifier which will subsequently control the energization of control saturable reactors 222, 223 and 224 through the choke 226.

The magnetic amplifier, as set forth in Figure 3, is a push-pull single phase center tap connected magnetic amplifier which includes saturable type reactors 242, 243, 244 and 245 and their associated diodes 246, 247, 248 and 249 respectively.

The magnetic amplifier is energized from a single phase center tapped A.-C. input which includes the transformer 250, the secondary of which has a center tap grounded at ground 251.

Since the output voltage of the magnetic amplifier described will have a strong second harmonic ripple, it is desirable to connect a capacitor 253 between the magnetic amplifier and ground at the ground 254.

A further smoothing choke 255 is connected in the output of the magnetic amplifier; the capacitor 253 further operating to prevent the relatively high inductance of choke 255 from affecting the normal resetting of the cycle of the magnetic amplifier saturable reactors.

The operation of the circuit of Figure 3, as described up to this point, will proceed as follows:

When the rectifier system produces the desired current, the feed-back voltage appearing on potentiometer 227 will generate a positive feed-back current in the right-hand control coils of auxiliary control reactors 222, 223 and 224 respectively to provide a sufficient control current to keep the voltage of the rectifier at this correct value of output current. Under this condition, the voltage across the lower half of potentiometer 241 will be identical to that across shunt 237 (since there is to be a zero error signal) and there will be a zero input current to the control coils of the magnetic amplifier reactors.

Hence, the output of the magnetic amplifier will be zero and the control current in the left-hand coils of auxiliary control reactors 222, 223 and 224 will be zero.

If, however, the load current is smaller than the preselected value required, then the voltage across the shunt 237 will be smaller than the reference voltage across the lower portion of rheostat 241 and a positive current caused by this error signal voltage will flow through the control coils of reactors 242, 243, 244 and 245 of the magnetic amplifier to thereby cause a positive output current through diodes 246 and 248. This output current is smoothed by choke 255 and flows through the three phase choke 226 and through the left-hand control coils of auxiliary control reactors 222, 223 and 224 respectively.

A constant difference between the desired current and actual current of the rectifier will cause a steady rate of increase of control current through the choke 255. This steady increase of control current will cause a steady but rapid increase of the output voltage of the rectifier, in view of the control of the main saturable reactors 210, 211 and 212 by the auxiliary control reactors 222, 223 and 224 respectively.

Hence, the rectifier will increase its output voltage very rapidly, and consequently the output current will be increased. This, in turn, will force the error signal which comprises a voltage difference between the voltage on shunt 237 and potentiometer 241 to become smaller and approach a zero value, at which time the regulator is again balanced.

Clearly, if the measured current of the rectifier is too high, the voltage difference between shunt 237 and potentiometer 241 will be negative, and a negative current will be delivered by the amplifier to the auxiliary control reactors 222, 223 and 224 to thereby cause a rapid rate of decrease of the output voltage of the rectifier until its load current decreases to the predetermined value selected by the potentiometer 241.

The above described regulator system is exceedingly sensitive and has a very short response time. In order to stabilize the operation of the regulator, I have found it desirable to provide a derivative inverse feed-back which is proportional to the rate of change of current of the rectifier output.

This auxiliary feed-back circuit includes a transformer 256 which is comprised of a core 257 having an air gap 258 therein.

The D.-C. load conductor 207 operates as a primary winding for transformer 256, and the transformer has the secondary windings 259, 260 and 261 wound thereon. This type of transformer, as is well known in the art, has a characteristic which is such that an output voltage will appear across windings 259, 260 and 261 which is proportional to the rate of change of current through the output D.-C. bus bar of rectifier system No. 1 which forms the primary winding of the transformer.

Thus, if the load current of rectifier system No. 1 increases, a positive voltage will appear across windings 259, 260 and 261 respectively, and, conversely, if the primary current decreases, a negative voltage will appear across the above noted windings.

The coil 259 is shown in Figure 3 as being connected across potentiometer 262 which has its upper end connected to ground 263. Therefore, any signal impressed across winding 259 will also appear in the circuit including ground 237, ground 238, the control windings of the magnetic amplifier including saturable reactors 242, 243, 244 and 245, the potentiometer 264 and the potentiometer 262.

Clearly, potentiometer 264 operates merely to adjust the derivative inverse feed-back provided by current rate transformer 256. Furthermore, this derivative inverse feed-back signal which appears across winding 259 will always be in such a direction as to oppose the error signal or voltage difference between shunt 237 and potentiometer 241.

Thus, the operation of this derivative inverse feed-back circuit is as follows:

If the output current of rectifier system No. 1 is too small, a positive error current will flow through the control windings due to the positive error signal caused by shunt 237 and rheostat 241. This causes a rapid increase in the output voltage in the current of rectifier system No. 1 whereby a voltage is induced across winding 259. The voltage induced across winding 259 will cause a negative voltage drop across rheostat 262 to ground 263 which will then cause a counter-current through the control coils of saturable reactors 242 through 245.

If the rate of increase in the load current is sufficient to bring the current error back to zero within the desired short time, then the rate signal received from the rate coil 259 will bring the regulator back to rest before the current has actually reached the desired value.

The current will continue to increase, if necessary, when a positive signal is still received by the difference between the voltages across shunts 237 and 241, and the rate signal induced in coil 259 will decrease to zero as soon as the rate of increase of current through the primary winding of transformer 256 becomes zero.

Therefore, it is possible to obtain an extremely rapid increase of load current which is stopped short as soon as the load current reaches the desired value which is set by the potentiometer 241. This rate of increase of load current can be adjusted to any desired magnitude by adjustment of potentiometer 262. Thus, if the compensation by derivative inverse feed-back is made exceedingly high, the regulator will respond relatively slowly because the error signal due to the voltages of shunt 237 and potentiometer 241 will be substantially compensated by the rate signal.

If, however, the compensation is reduced by adjustment of rheostat 262, then the regulator will act extremely quickly, inasmuch as it is permitted to swing almost freely and is checked back only at the last instant.

Obviously, if the derivative inverse feed-back is made too small, the complete regulator system may hunt. Thus, for practical operation it would be desirable in most cases to adjust rheostat 262 such that the overswing is small and hunting oscillations are rapidly reduced to zero.

If the current regulator and rectifier is operated upon a system which has frequent parameter changes and is highly unstable, then it would be desirable to increase the negative feed-back to slow down the regulator operation, thereby preventing hunting within the whole system.

As in the case of Figures 1 and 2, my novel system is well adapted to provide cross compounding between the parallel connected rectifier systems 1, 2 and 3. This may be required since, when several rectifiers operate in parallel as shown in Figure 3, and the D.-C. load has a low resistance and a high counter-electro-motive force, then a sudden increase of the output of rectifier system No. 1 will cause an equal decrease of the outputs of rectifiers Nos. 2 and 3.

When the regulators of these other rectifiers have sensed their decrease they will tend to increase their outputs. However, the increase of the other rectifiers comes at a time when the regulator of rectifier system No. 1 finds its output at too high a value and causes a reduction thereof. The increase of the other rectifiers together with the decrease of the first rectifier then causes a larger total decrease in the first rectifier system than the original increase. The first regulator then tries to compensate for this decrease and increases its load current even more than it had in the first instance. This operation may then proceed for an indeterminate time leading to severe oscillations in load current between the various rectifiers which may not be checked by their own individual regulators.

It is to be noted that the inverse feed-back caused by current rate transformers 265 and 266 of rectifier systems 1, 2 and 3 respectively will partially compensate for this action, for if the current suddenly increases because of a decrease of a parallel connected rectifier system, this curent increase will be fed back by the rate transformer in the same manner as though it came from the regulator itself, and will immediately cause a compensating voltage output increase before the current has changed materially.

However, if the whole system is unstable, it may be highly desirable to provide cross compounding. Cross compounding is provided, as shown in Figure 3, by connecting the windings 267 and 268 of rate transformers 265 and 266 across potentiometer 264 of the regulator of rectifier No. 1. This cross compounding will produce a voltage across the rheostat 264 which provides negative feed-back of a signal in a direction to stabilize the operation of all three parallel connected rectifier systems.

Similarly, cross compounding windings are also used in the other transformers 265 and 266 to stabilize the operation of the regulators associated with rectifier systems 2 and 3 respectively in an identical manner, as described for rectifier system No. 1.

It may be noted that under normal conditions the rheostat 264 may be short circuited so that there is no cross compounding. If, however, instability is encountered the desired amount of cross compounding can be adjusted by means of this rheostat.

Although I have described preferred embodiments of my novel invention, many variations and modifications will now be obvious to those skilled in the art, and I prefer, therefore, to be limited not by the specific disclosure herein but only by the appended claims.

I claim:
1. In a rectifier comprising rectifying elements connectable between an A.-C. system and a D.-C. load; said rectifier elements being connected in series with saturable type reactors for controlling the length of time A.-C. voltage is impressed across said D.-C. load to thereby control the output voltage to said D.-C. load; a static current regulator connected to flux reversal windings of said saturable type reactors for controlling the flux reversal of said saturable type reactors; said static current regulator comprising means for measuring the current flowing to said D.-C. load, a reference standard means for comparing said measured load current to a predetermined value, D.-C. amplifying means having its output operatively connected to said flux reversal windings of said saturable type reactors, and a negative feed-back means; said current measuring means and said reference standard means being connected to develop an error signal responsive to variation of said measured current from said standard, circuit connections for connecting said error signal to the input of said D.-C. amplifier to control the output thereof to vary the flux reversal energization of said saturable type reactors and the D.-C. load current of said rectifiers to bring an error signal to zero; said negative feed-back means including circuit means for altering said error signal responsive to a change in said D.-C. load current; said circuit connections for connecting said error signal to the input of said D.-C. amplifier including an integrator circuit for integrating said error signal and applying the integrated value to said D.-C. amplifier.

2. In a rectifier comprising rectifying elements connectable between an A.-C. system and a D.-C. load; said rectifier elements being connected in series with saturable type reactors for controlling the length of time A.-C. voltage is impressed across said D.-C. load to thereby control the output voltage to said D.-C. load; a static current regulator connected to flux reversal windings of said saturable type reactors for controlling the flux reversal of said saturable type reactors; said static current regulator comprising means for measuring the current flowing to said D.-C. load, a reference standard means for comparing said measured load current to a predetermined value, D.-C. amplifying means having its output operatively connected to said flux reversal windings of said saturable type reactors, and a negative feed-back means; said current measuring means and said reference standard means being connected to develop an error signal responsive to variation of said measured current from said standard, circuit connections for connecting said error signal to the input of said D.-C. amplifier to control the output thereof to vary the flux reversal energization of said saturable type reactors and the D.-C. load current of said rectifiers to bring an error signal to zero; said negative feed-back means including circuit means for altering said error signal responsive to a change in said D.-C. load current; said circuit connections for connecting said error signal to the input of said D.-C. amplifier including a preamplifier and an integrator circuit, said preamplifier having said error signal and said feed-back signal applied to the input thereof, said integrator signal being interposed between the output of said preamplifier and the input of said D.-C. amplifier.

3. In a rectifier comprising rectifying elements connectable between an A.-C. system and a D.-C. load; said rectifier elements being connected in series with saturable type reactors for controlling the length of time A.-C. voltage is impressed across said D.-C. load to thereby control the output voltage to said D.-C. load; a static current regulator connected to flux reversal windings of said saturable type reactors for controlling the flux reversal of said saturable type reactors; said static current regulator comprising means for measuring the current flowing to said D.-C. load, a reference standard means for comparing said measured load current to a predetermined value, D.-C. amplifying means having its output operatively connected to said flux reversal windings of said saturable type reactors, and a negative feed-back means; said current measuring means and said reference standard means being connected to develop an error signal responsive to variation of said measured current from said standard, circuit connections for connecting said error signal to the input of said D.-C. amplifier to control the output thereof to vary the flux reversal energization of said saturable type reactors and the D.-C. load current of said rectifiers to bring an error signal to zero; said negative feed-back means including circuit means for altering said error signal responsive to a change in said D.-C. load current; said static current regulator of said rectifier being cross-compounded with regulators of parallel connected rectifiers; said parallel connected rectifiers having cross-compounding circuit output signal proportional to a change in current of their respective rectifiers; said cross-compounding signals being added to said error signal in said static regulator to compound said rectifier with said parallel connected rectifiers.

4. In a rectifier comprising rectifying elements connectable between an A.-C. system and a D.-C. load; said rectifier elements being connected in series with saturable type reactors for controlling the length of time A.-C. voltage is impressed across said D.-C. load to thereby control the output voltage to said D.-C. load; a static current regulator connected to flux reversal windings of said saturable type reactors for controlling the flux reversal of said saturable type reactors; said static current regulator comprising means for measuring the current flowing to said D.-C. load, a reference standard means for comparing said measured load current to a predetermined value, D.-C. amplifying means having its output operatively connected to said flux reversal windings of said saturable type reactors, and a negative feed-back means; said current measuring means and said reference standard means being connected to develop an error signal responsive to variation of said measured current from said standard, circuit connections for connecting said error signal to the input of said D.-C. amplifier to control the output thereof to vary the flux reversal energization of said saturable type reactors and the D.-C. load current of said rectifiers to bring an error signal to zero; said negative feed-back means including circuit means for altering said error signal responsive to a change in said D.-C. load current; said circuit connections for connecting said error signal to the input of said D.-C. amplifier including a pre-amplifier and an integrator circuit, said preamplifier having said error signal and said feed-back signal applied to the input thereof, said integrator signal being interposed between the output of said preamplifier and the input of said D.-C. amplifier; said static current regulator of said rectifier being cross-compounded with regulators of parallel connected rectifiers; said parallel connected rectifiers having cross-compounding circuit output signal proportional to a change in current of their respective rectifiers; said cross-compounding signals being added to said error signal in said pre-amplifier to compound said rectifier with said parallel connected rectifiers.

5. In a rectifier comprising rectifying elements connectable between an A.-C. system and a D.-C. load; said rectifier elements being connected in series with saturable type reactors for controlling the length of time A.-C. voltage is impressed across said D.-C. load to thereby control the output voltage to said D.-C. load; a static current regulator connected to flux reversal windings of said saturable type reactors for controlling the flux reversal of said saturable type reactors; said static current regulator comprising means for measuring the current flowing to said D.-C. load, a reference standard means for comparing said measured load current to a predetermined value, D.-C. amplifying means having its output operatively connected to said flux reversal windings of said saturable type reactors, and a negative feed-back means; said current measuring means and said reference standard means being connected to develop an error signal responsive to variation of said measured current from said standard, circuit connections for connecting said error signal to the input of said D.-C. amplifier to control the output thereof to vary the flux reversal energization of said saturable type reactors and the D.-C. load current of said rectifiers to bring an error signal to zero; said negative feed-back means including circuit means for altering said error signal responsive to a change in said D.-C. load current; said negative feed-back signal being taken from the output of a current rate transformer connected in the output of said rectifier.

6. In a rectifier comprising rectifying elements connectable between an A.-C. system and a D.-C. load; said rectifier elements being connected in series with saturable type reactors for controlling the length of time A.-C. voltage is impressed across said D.-C. load to thereby control the output voltage to said D.-C. load; a static current regulator connected to flux reversal windings of said saturable type reactors for controlling the flux reversal of said saturable type reactors; said static current regulator comprising means for measuring the current flowing to said D.-C. load, a reference standard means for comparing said measured load current to a predetermined value, D.-C. amplifying means having its output operatively connected to said flux reversal windings of said saturable type reactors, and a negative feed-back means; said current measuring means and said reference standard means being connected to develop an error signal responsive to variation of said measured current from said standard, circuit connections for connecting said error signal to the input of said D.-C. amplifier to control the output thereof to vary the flux reversal energization of said saturable type reactors and the D.-C. load current of said rectifiers to bring an error signal to zero; said negative feed-back means including circuit means for altering said error signal responsive to a change in said D.-C. load current; said reference standard means being adjustable to adjust the response characteristic of said rectifier; said flux reversal windings being further energized proportionally to the output voltage of said rectifier; said D.-C. amplifier output supplementing the energization of said energization proportional to said output voltage; said negative feed-back signal being taken from the output of a current rate transformer connected in the output of said rectifier.

7. In a rectifier comprising rectifying elements connectable between an A.-C. system and a D.-C. load; said rectifier elements being connected in series with saturable type reactors for controlling the length of time A.-C. voltage is impressed across said D.-C. load to thereby control the output voltage to said D.-C. load; a static current regulator connected to flux reversal windings of said saturable type reactors for controlling the flux reversal of said saturable type reactors; said static current regulator comprising means for measuring the current flowing to said D.-C. load, a reference standard means for comparing said measured load current to a predetermined value, D.-C. amplifying means having its output operatively connected to said flux reversal windings of said saturable type reactors, and a negative feed-back means; said current measuring means and said reference standard means being connected to develop an error signal responsive to variation of said measured current from said standard, circuit connections for connecting said error signal to the input of said D.-C. amplifier to control the output thereof to vary the flux reversal energization of said saturable type reactors and the D.-C. load current of said rectifiers to bring an error signal to zero; said negative feed-back means including circuit means for altering said error signal responsive to a change in said D.-C. load current; said reference standard means being adjustable to adjust the response characteristic of said rectifier; said flux reversal windings being further energized proportionally to the output voltage of said rectifier; said D.-C. amplifier output supplementing the energization of said energization proportional to said output voltage; said negative feed-back signal being taken from the output of a current rate transformer connected in the output of said rectifier; said static current regulator of said rectifier being cross-compounded with regulators of parallel connected rectifiers; said parallel connected rectifiers having cross-compounding circuit output signal proportional to a change in current of their respective rectifiers; said cross-compounding signals being added to said error signal in said static regulator to compound said rectifier with said parallel connected rectifiers.

References Cited in the file of this patent

UNITED STATES PATENTS

| | | |
|---|---|---|
| 2,243,572 | Moyer et al. | May 27, 1941 |
| 2,723,372 | Eagan et al. | Nov. 8, 1955 |
| 2,756,381 | Rolf | July 24, 1956 |
| 2,790,127 | Hamilton | Apr. 23, 1957 |
| 2,810,877 | Silver | Oct. 22, 1957 |